United States Patent
Helms et al.

(10) Patent No.: US 6,889,332 B2
(45) Date of Patent: May 3, 2005

(54) VARIABLE MAXIMUM DIE TEMPERATURE BASED ON PERFORMANCE STATE

(75) Inventors: Frank P. Helms, Round Rock, TX (US); Jeffrey A. Brinkley, Georgetown, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 554 days.

(21) Appl. No.: 10/015,031

(22) Filed: Dec. 11, 2001

(65) Prior Publication Data

US 2003/0110423 A1 Jun. 12, 2003

(51) Int. Cl.$^7$ ................................................ G06F 1/26

(52) U.S. Cl. ........................ 713/322; 713/501; 702/132

(58) Field of Search ................................ 713/322, 501; 702/132

(56) References Cited

U.S. PATENT DOCUMENTS

| | | | |
|---|---|---|---|
| 5,502,838 A | * | 3/1996 | Kikinis ........................ 713/501 |
| 5,511,203 A | | 4/1996 | Wisor et al. |
| 5,682,273 A | | 10/1997 | Hetzler |
| 5,713,030 A | * | 1/1998 | Evoy ........................ 713/322 |
| 5,745,375 A | | 4/1998 | Reinhardt et al. |
| 5,752,011 A | * | 5/1998 | Thomas et al. ............. 713/501 |
| 5,812,860 A | | 9/1998 | Horden et al. |
| 5,838,968 A | | 11/1998 | Culbert |
| 5,852,737 A | | 12/1998 | Bikowsky |
| 5,873,000 A | | 2/1999 | Lin et al. |
| 5,881,298 A | | 3/1999 | Cathey |
| 5,884,049 A | | 3/1999 | Atkinson |
| 5,887,179 A | | 3/1999 | Halahmi et al. |
| 5,925,133 A | | 7/1999 | Buxton et al. |
| 5,954,820 A | | 9/1999 | Hetzler |

(Continued)

FOREIGN PATENT DOCUMENTS

| | | |
|---|---|---|
| EP | 0 632 360 A1 | 1/1995 |
| JP | 08328698 | 12/1996 |
| JP | 10198456 A | 7/1998 |

OTHER PUBLICATIONS

IBM Technical Disclosure Bulletin, "Power Management Clock Change for 603 Processor," vol. 38, No. 12, Dec. 1995, pp. 325–327.

PC NTMMTA: Using Performance Monitor with MMTA (Q130288), http://support.microsoft.com/default.aspx?scid=kb;en–us;Q130288 (3 pages) (last modified Aug. 8, 2001); printed Apr. 16, 2002.

Performance Monitor Collects Data for Only One Instance (Q101474), http://support.microsoft.com/default.aspx?scid=kb;en–us;Q[0]474 (2 pages) (last modified Nov. 5, 1999), printed Apr. 16, 2002.

*Primary Examiner*—A. Elamin
(74) *Attorney, Agent, or Firm*—Zagorin O'Brien Graham LLP

(57) ABSTRACT

The maximum performance state available to a processor in a computer system, in terms of operating frequency and/or voltage, changes according to thermal criteria. When the temperature increases above a predetermined threshold, the maximum performance state available is reduced. Multiple temperature thresholds may be utilized providing for a gradually reduced maximum performance state as temperature increases. When the temperature returns to a lower level, the maximum performance state available is increased. Changing the maximum available performance state according to temperature provides for more gradual reduction in performance as temperature increases, which results in higher average system performance as temperature increases. Thus, a more gradual reduction in performance is provided while still maintaining a high speed rating of the processor in more ideal conditions. In normal operating conditions, high processor performance is provided, while slightly reduced performance is provided in abnormal operating conditions.

21 Claims, 4 Drawing Sheets

U.S. PATENT DOCUMENTS

| | | |
|---|---|---|
| 5,958,058 A | 9/1999 | Barrus |
| 6,006,248 A | 12/1999 | Nagae |
| 6,014,611 A | 1/2000 | Arai et al. |
| 6,073,244 A | 6/2000 | Iwazaki |
| 6,076,171 A | 6/2000 | Kawata |
| RE36,839 E | 8/2000 | Simmons et al. |
| 6,119,241 A * | 9/2000 | Michail et al. ............ 713/322 |
| 6,128,745 A | 10/2000 | Anderson |
| 6,151,681 A | 11/2000 | Roden et al. |
| 6,363,490 B1 * | 3/2002 | Senyk ........................ 713/300 |
| 6,442,700 B1 | 8/2002 | Cooper |
| 6,574,740 B1 | 6/2003 | Odaohhara et al. |
| 6,594,753 B2 | 7/2003 | Choquette et al. |
| 6,630,754 B1 * | 10/2003 | Pippin ........................ 307/117 |
| 6,647,320 B1 * | 11/2003 | Inoue ........................ 700/300 |
| 6,701,273 B2 * | 3/2004 | Nishigaki et al. ........... 702/132 |
| 6,711,129 B1 | 3/2004 | Bauer et al. |

* cited by examiner

FIG. 4

| Temperature | Type of Trip Point | Action | Available Performance States | Temp Range |
|---|---|---|---|---|
| 103C | Critical Trip Point | OS performs orderly shut down | | |
| 98C | Passive Trip Point (max active cooling) | OS throttles processor (50%) | P2, P3, P4 | >80C |
| ≥80C | Maximum Pstate Change | Transition to Pstate2 as max | | |
| ≤78C | Maximum Pstate Change | Transition to Pstate1 as max | P1, P2, P3, P4 | 70-80C |
| ≥70C | Maximum Pstate Change | Transition to Pstate1 as max | | |
| ≤68C | Maximum Pstate Change | Transition to Pstate 0 as max | | |
| 65C | Active trip point 2 (max active cooling) | Turn on Fan 100% | P0, P1, P2, P3, P4 | <70C |
| 60C | Active trip point 3 (med active cooling) | Turn on Fan 66% | | |
| 50C | Active trip point 4 (min active cooling) | Turn on Fan 33% | | |

VARIABLE MAXIMUM DIE TEMPERATURE BASED ON PERFORMANCE STATE

BACKGROUND

1. Field of the Invention

This invention relates to computer systems and more particularly to power management of computer systems.

2. Description of the Related Art

An important market criteria for microprocessors is the rated frequency at which the microprocessor operates, typically denominated in hundreds of MHz or GHz. Rated frequency is used as a surrogate for performance and higher performance processors command higher prices. Thus, it is advantageous to market processors with the highest possible frequency rating.

However, there are limitations as to how high one may rate a processor in terms of frequency. As the number of transistors provided on a single integrated circuit has increased and the clock speed of integrated circuits has increased, power and related thermal considerations have become an important consideration in computer design. Power and thermal considerations can limit processor performance in certain environments, particularly in mobile applications. Computer systems measure the die temperature or case temperature using sensors on or close to the processor. In order to keep processor die temperatures within safe bounds to avoid potential damage to the processor, passive and active cooling have traditionally been employed to control temperature. Passive cooling has been accomplished by reducing a processors clocks speed, either by throttling processor clocks (reducing effective frequency by turning clocks off for a predetermined period) or by reducing actual frequency of the clocks. Reducing the actual and/or effective frequency of an integrated circuit causes a reduction in power consumption and thus reduces temperature. In addition to reducing clock frequency, it is known in the art to reduce voltage in conjunction with reduced clock speed to achieve additional cooling.

Thus, the rated processor speed can be limited by power and thermal considerations and more specifically is determined, at least in significant part, by operating frequency, voltage, and temperature. If the die temperature can be kept sufficiently low, the rated processor clock speed can be increased. In one prior art approach to maximizing frequency at which a processor can be marketed, the processor includes an on-die temperature sensor that automatically throttles (reduces) the CPU's clock by 50% if the processor's temperature crosses a factory set threshold. If the maximum die temperature is set at a sufficiently low level of, e.g., 70 degrees C., the processor is able to meet the timing budget for the silicon process in which it is manufactured at a higher frequency at a given voltage than if the die temperature was significantly higher. The timing budget is the amount of time a signal has to propagate through combinational logic from one set of storage elements (e.g., flip-flops) to another set of storage elements and meet the setup and hold times associated with the flip-flops. At a lower temperature, a device can more easily meet a timing budget because, e.g., the propagation delays are reduced. Thus, to ensure that timing budgets are met, in the prior art approach described above, when the maximum die temperature associated with the device is crossed, e.g., 70 degrees C., the processor clock is throttled back to, e.g., 50% of its rated speed, which reduces the power consumption and thus the temperature. Thus, a processor rated at 2 GHz would run at 1 GHz upon crossing of the maximum die temperature threshold. In that way the processor can be rated at a higher speed at or below 70 degrees C., although it may operate with significantly reduced capability above that temperature.

While that allows the processor to be rated highly, it also results in a system that operates at a significantly lower clock speed in certain environments. It would be desirable to ship more higher speed rated processors without having to drastically sacrifice performance when the critical temperature threshold is crossed.

SUMMARY

Accordingly, the invention provides a system in which the maximum performance state, which is typically based on such factors as operating frequency and voltage, changes according to thermal criteria. The thermal criteria may be, for example, a die temperature of the microprocessor. Once the temperature crosses above a predetermined temperature threshold, the maximum performance state available to the system is changed to a lower performance state. As the temperature crossed above successive temperature thresholds, successively lower maximum performance states become available to the system. That allows processor performance to be impacted less than the throttling alternative described above as the temperature increases. When the temperature crosses below a predetermined temperature threshold, a higher maximum performance state is again available to the system. Hysteresis may be implemented to ensure the system does not rapidly switch between performance states when the temperature is close to predetermined thresholds.

In an embodiment, the invention provides a processor that has multiple performance states determined by such factors as operating frequency and/or voltage. In a first temperature range, the processor operates with a first maximum performance state and in a second temperature range, higher than the first temperature range, the processor operates with a lower maximum performance state.

In another embodiment the invention provides a method of operating a computing system that includes determining a temperature associated with an integrated circuit and operating the integrated circuit with a first performance state as a maximum performance state according to the determined temperature, the first performance state being one of a plurality of performance states available at the determined temperature.

In another embodiment a method for providing a variable maximum die temperature for an integrated circuit in a computer system having a plurality of different maximum performance states, comprising increasing the maximum allowable die temperature as a maximum allowable performance state is decreased.

BRIEF DESCRIPTION OF THE DRAWINGS

The present invention may be better understood, and its numerous objects, features, and advantages made apparent to those skilled in the art by referencing the accompanying drawings in which the use of the same reference symbols in different drawings indicates similar or identical items.

FIG. 4 illustrates a table including various temperature trip points for an exemplary system.

DESCRIPTION OF THE PREFERRED EMBODIMENTS

A computer system according to one embodiment of the invention has a plurality of processor performance states, the processor performance states being generally determined by unique voltage/frequency combinations. The computing system provides lower maximum performance states as the detected temperature of, e.g. the processor die, increases. In addition to having a different maximum performance state associated with particular temperature ranges, the computer system may change to a different performance states based on such factors as processor utilization as explained more fully herein. The detected temperatures may be related directly to the processor by measuring the die temperature directly using a sensor on the die or may measure the die temperature indirectly using a sensor that is off-die. In addition, other indirect measurements may be taken such as ambient temperatures or measurements of the temperature of other computer system components to determine the appropriate mode of operation although indirect measurements may reduce accuracy. Because the different temperature ranges have different maximum performance states, the maximum amount of power that can be consumed grows less as the temperature increases through the various temperature ranges and lower maximum performance states are provided.

While a performance state is commonly based in operating voltage and frequency, other criteria can also be used. For example, in some embodiments, processor performance states could be determined by an amount of chip area that was enabled for processing. Thus, portions of the processor may be selectively disabled to control the amount of power consumed. For example, the number of execution units that are enabled may vary.

Figure 1:
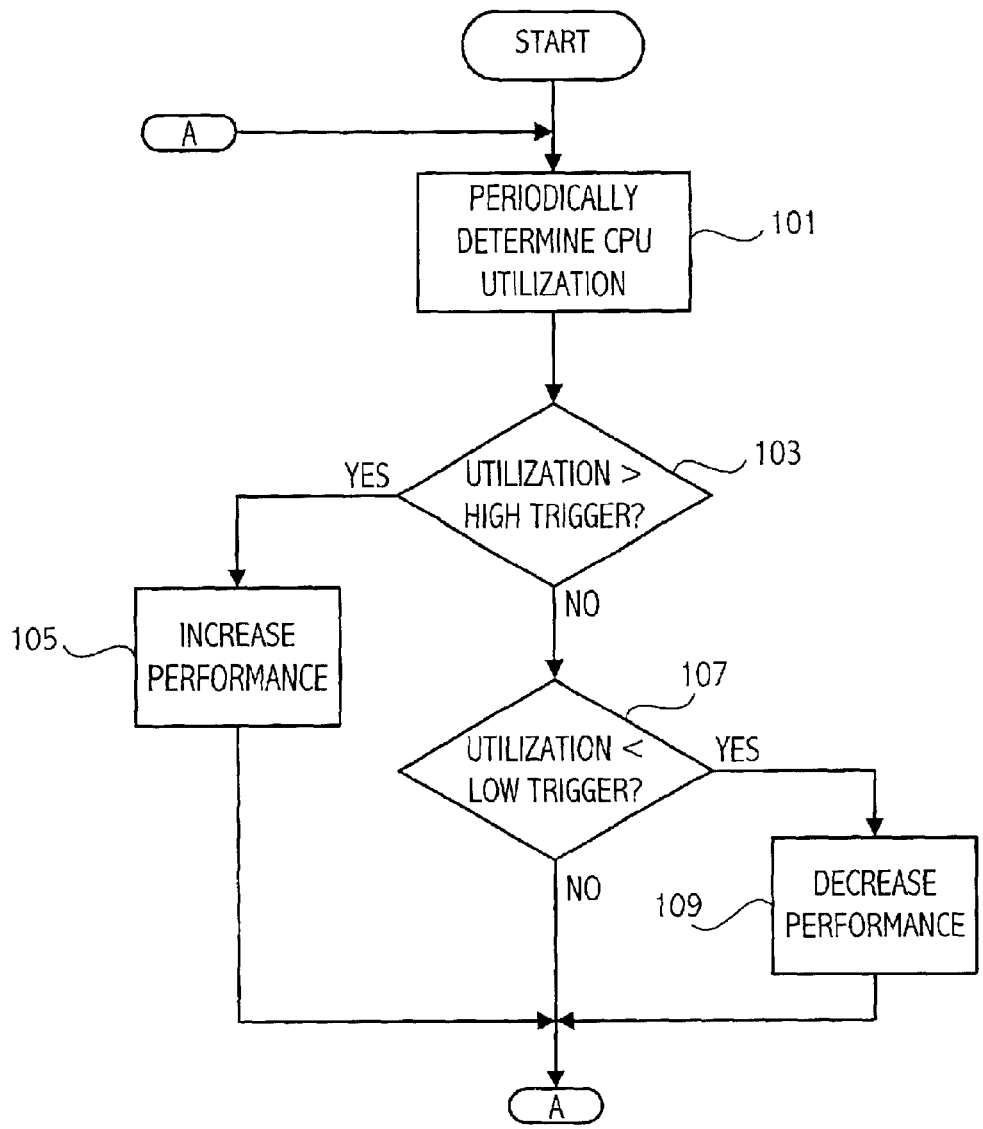
FIG. 1 is a high level flow diagram of power management operations based on CPU utilization.

In order to more fully appreciate the invention, the use of performance states is described in which a power management control function in the computer system periodically determines the utilization level of the processor, i.e., how much of the available processor resources are being utilized, and selects a performance state that is appropriate for the utilization level. Referring to FIG. 1, a flow diagram illustrates at a high level, operation of an embodiment of a power management function utilized to provide the requisite power management control. The current CPU utilization is periodically determined in 101. That current utilization is then compared to a high threshold level, e.g., 80% of processing resources, in 103. If the utilization level is above the high threshold level, indicating that processor resources are being utilized at a level above 80%, the power management control function increases the performance state of the processor in 105. In one embodiment, that can be accomplished by selecting a voltage/frequency pair that provides greater performance and then causing the processor to operate at the new voltage and frequency, as described further herein.

If the current utilization is below the high threshold, then the current utilization is compared to the low threshold in 107. An exemplary low threshold level is 55%. If the current utilization is below that low threshold, the power management control function decreases the performance state of the processor in 109. As described further herein, that may be accomplished by selecting, e.g., a voltage/frequency pair providing lower performance and then causing the performance change to occur. The power management control function then returns to 101 to periodically determine the utilization level and again compare the current utilization level to the high and low threshold levels. In that way the power management can tailor the performance state of the processor to the actual requirements.

In a computer system with several possible processing performance states, if the management control function determines that more performance is necessary to meet performance requirements, one approach to providing increased performance is to increase the performance one step at a time until the current utilization is below the high threshold level. However, in another approach rather than increasing the performance state one step at a time, the power management control function selects the highest performance state regardless of the current performance state. The reasons for always selecting the highest possible performance state when a higher performance state is needed are as follows. In computer systems, performance demands are often of a bursty nature. When a higher performance state is required based on the current utilization level, stepping the performance state to a next higher level can result in degradation of performance that can be perceived by the user. That is especially true when the task that needs the increased performance requires a near real-time response, for instance, while decoding an audio or video file.

Figure 2:
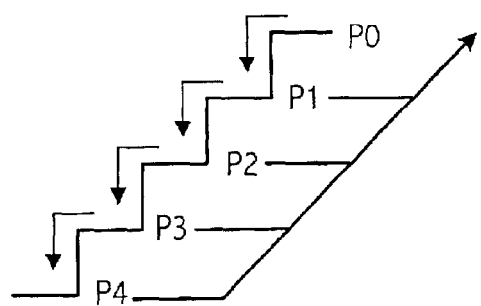
FIG. 2 illustrates switching between performance states according to utilization.

FIG. 2 illustrates that concept. Assume the processor has five performance states P0–P4, with P0 being the highest and P4 the lowest. Whenever the power management determines that a higher performance state is required when operating at any of the levels P1–P4, the power management selects the maximum performance state P0 as the next performance state. Thus, in one embodiment, if the performance state is always taken straight to the maximum performance state when a performance increase is required, rather than stepping up to the maximum performance state, there is less of a chance that a user could notice any performance degradation. In effect, the power management control function anticipates a peak loading by assuming that any indication of a required increase in performance is assumed to be a burst requiring peak performance.

However, if a lower performance state is required, a next lower performance state is selected. Thus, if at performance state P0, P1 is selected as the next lower performance state. If the current performance state is P1, the next lower performance state selected is P2 when a performance decrease is effectuated by the power management control function. In that way, if the performance is still too high, successively lower performance states can be selected and the chance than any degradation is detected by a system user is reduced. Thus, if the utilization information indicates that an increase in performance is necessary, the power management control function selects the maximum (or near maximum) performance state, while a decrease in performance causes the power management control function to step to the next lowest performance state.

If the processor utilization is kept within the range of the high and low thresholds, then a user should experience a crisp, high performance system, while still getting the benefit of power savings for those applications or those portions of applications requiring less performance. That approach reduces power consumption, extends battery life, reduces temperature resulting in less need for cooling and thus less fan noise, while still maintaining high performance and thus maintaining a perception of fast response to the user. Note that running at a lower average CPU die temperature increases CPU reliability, and that a lower CPU temperature results in a lower system temperature, which increases system reliability.

Figure 3:
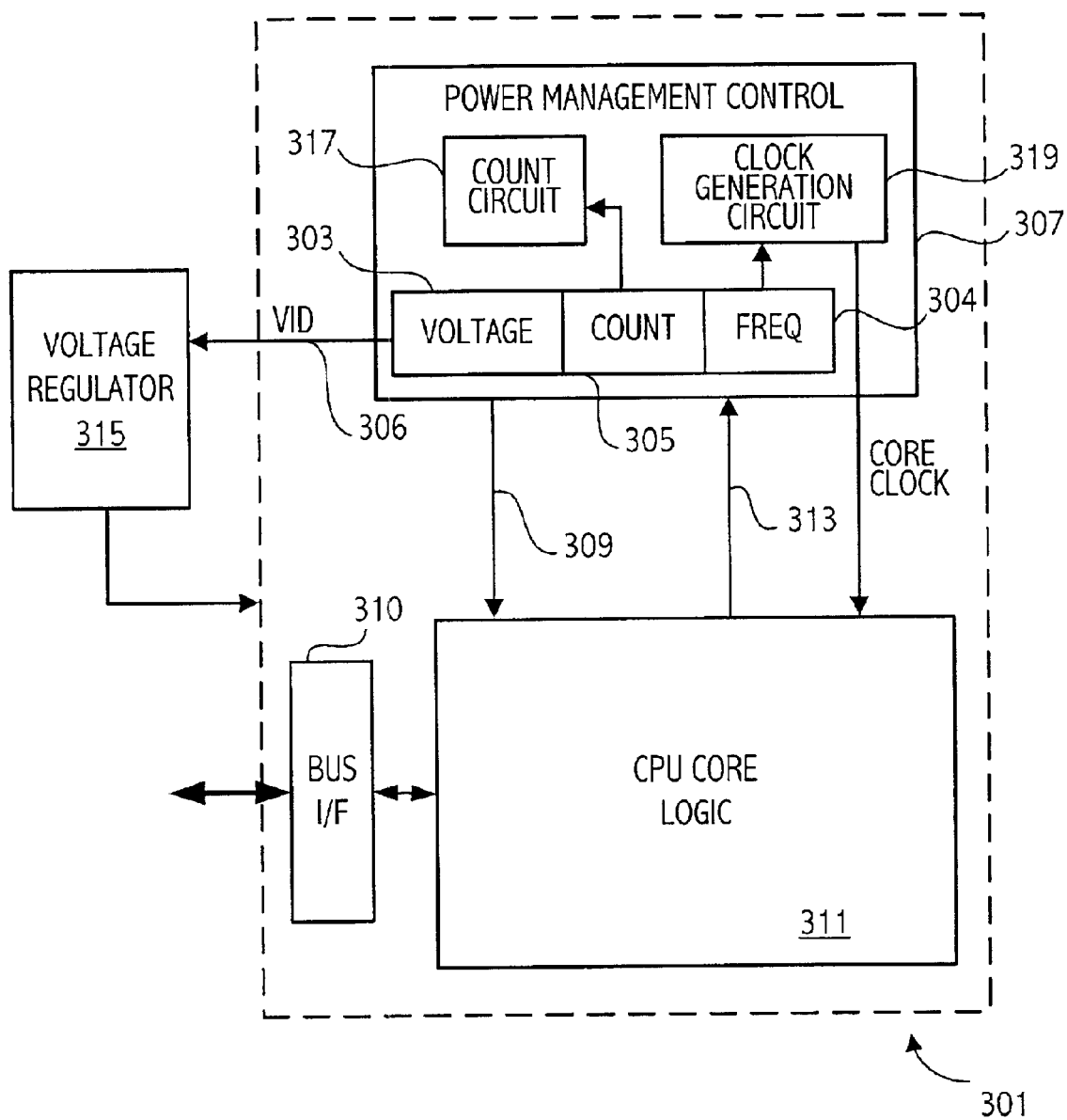
FIG. 3 illustrates an exemplary processing system that can change performance state.

In order to effect changes to the performance state, the power management software has to cause the voltage and frequency used by the CPU to change. In one embodiment that can be accomplished as follows. Referring to FIG. 3, a processor is shown that can dynamically adjust its frequency and/or operating voltage to provide better thermal and power management in accordance with processor utilization. Processor 301 includes a programmable voltage control field 303, core clock frequency control field 304 and count field 305. Those fields may be located in one or more programmable registers. When the processor and/or system determines that a change to the operating voltage and/or frequency is desired to increase or decrease the performance state, the desired frequency and voltage control information are loaded into frequency control field 304 and voltage control field 303, respectively. Access to a register containing those fields, or an access to another register location, or access to a particular field in one of those registers can be used as a trigger to initiate the protocol for a performance state change. The protocol, which will vary according to processor design, ensures that the processor enters a quiescent state that is suitable for performance state transitions.

In some protocols, that will ensure that the portion of the processor, referred to for convenience herein as the CPU core logic 311 becomes quiescent, including any external bus interfaces 310 and interfaces with internal logic that may not be affected by the performance state change. Note that in one implementation bus interface 310 is implemented separately from CPU core logic 311 and functions to hold off traffic to CPU core logic 311 during performance state transitions. Various messages may be sent or signals provided indicating that the processor has or is about to enter the quiescent state. In addition various control and/or status signals 309 and 313 may be provided to and from core logic 311. Note that in some processor implementations, various power planes and clock grids may ensure some parts of the processor are unaffected by the processor core logic 311 entering the quiescent state. Further, the quiescent state may vary according to processor design. For example, for one processor the quiescent state may have the clocks turned off and in other processors, the clocks may be reduced to an extent to allow appropriate voltage changes. Note also that the power state changes may include clock frequency changes, voltage changes or both. In x86 architectures, such a quiescent state has been referred to as the "stop grant" state in which execution of operating system and application code is stopped. As would be known to those of skill in the art, other ways may be used to initiate the protocol necessary to enter the quiescent state suitable for performance state changes. For example, initiation of the protocol to enter the quiescent state may be indicated by writing a command over a communication link coupling the processor to another device.

Once in the quiescent state, the processor can transition the voltage and frequency to the new states specified in voltage control field 303 and clock frequency control field 304. As described above, in some processor implementations, the processor core clocks are stopped after the processor enters the quiescent state to suitable for changing performance states. In other processor implementations, the processor core clock frequency is reduced to a frequency which can safely tolerate desired voltage changes. In one implementation clock control frequency information is supplied as multiplier values for a clock that is supplied to processor 301. Those of skill in the art appreciate that many other approaches can be used to specify the core operating frequency. In either case, the voltage control information specified in voltage control field 303 is supplied to voltage regulator 315 which in turn supplies CPU core logic 311 with the new voltage during the quiescent state. As will be appreciated by those of skill in the art, there are many alternatives to supplying the voltage information to an external voltage regulator from a register in the processor. For example, the voltage information may be supplied from a device outside the processor, or may be supplied by a communication link with a voltage regulator circuit.

Because changing the voltage and frequency can not be done instantaneously, the quiescent state is typically maintained for a period of time to allow the new voltage and clock frequency to stabilize. That time period may be specified in count field 305 and counted using a counter in the processor or in another location in the computer system. Once the count is complete, the protocol is initiated to exit the quiescent state and resume executing operating system and application code, including restarting any buses that have been "turned off" by the processor as part of entering the quiescent state.

Note that changing both voltage and frequency to enter a new performance state can be particularly effective. Changes in the processor's core clock frequency have an approximately linear affect on the power dissipated by the processor. Thus, a 20% reduction in clock frequency reduces the power dissipated by the processor by 20%. The range of change is significant since a ratio of highest frequency to lowest frequency is usually greater than 2:1. Consequently, the processor's power may be changed by similar ratio. Changes in the processor's core voltage have an approximately square law effect. That is, potential power savings is proportional to the square of the voltage reduction. The square law effect results in significant changes in the processor's power if the core voltage of the processor is reduced.

In addition to modifying processor frequency and/or voltage and to match processor utilization, computer systems also monitor temperature and take active or passive power management actions to ensure that the temperature of the processor die stays within operational levels using power management control software such as that associated with the Advanced Configuration and Power Interface (ACPI) Specification. For example, at certain temperatures, the computing system may take actions that take active power management action such as turning on a fan, or increasing fan speed. At other temperatures, a computer system may take passive actions such as throttling the processor (reducing its effective frequency by stopping or slowing clocks with a predetermined duty cycle and period appropriate for the processor). At another temperature threshold, the processor may shut down the computer system to prevent potential damage. FIG. 4 illustrates an exemplary set of temperature "trip points" at which power management activities take place. As shown in FIG. 4, there are "active" trip points at which various actions are performed such as adjusting fan speed. The types of actions described in FIG. 4 are in addition to the utilization based power management described previously. The actual temperatures, the number of trip points, and the specific actions taken will of course vary according to the particulars of the computer system.

Note that the power management control described herein may be implemented as part of the operating system (OS), in whole or in part. In addition, separate power management applications may incorporate some or all of the capability described herein. In other computer systems, the various power management tasks may be shared between the operating system, software applications running under the operating system and BIOS routines. In addition, the power management techniques may be implemented in hardware.

Now that the process of changing processor states has been described, and the utilization of trip points in power management has been described, the utilization of different maximum performance states based on temperature will be described. Assume that a processor system has five performance states P0–P4, with P0 being the highest performance state. The highest performance state is that state having the highest clock frequency (and in some embodiments the highest voltage) and having the highest power consumption. Referring again to FIG. 4, the performance states available are shown to be based on temperature range.

In the example shown in the last column of the table in FIG. 4, when the die temperature is below 70 C, all the performance states are available (P0–P4) and the maximum performance state available, e.g., for utilization based (or other) power management activities, is the maximum performance state that the system provides, namely P0. When the temperature is between 70 C and 80 C, the performance states available are P1–P4 with the maximum available performance state being P1. Finally, when the temperature crosses above 80 C the available performance states are further reduced, with the maximum available performance state being P2. Thus, the embodiment represented in FIG. 4, both the number of performance states and the maximum performance state changes based on temperature trip points of 70 C and 80 C.

When the temperature falls back into a temperature range, e.g., <70 C, the higher maximum performance state once again becomes available. However, in one embodiment a temperature trip point that causes the system to make a higher maximum performance state available differs from the temperature trip point that causes a lower maximum performance state to be available. That provides hysteresis and avoids frequent changes in the available maximum performance state if the temperature is at or near a trip point.

In the example shown in FIG. 4, hysteresis is implemented by causing P0 to become unavailable as the maximum performance state at 70 C but to again become available at a temperature trip point of 68 C. Thus, if the system is operating with P1 as the maximum performance state and a temperature of 68 C is detected, P0 becomes the maximum performance state. Similarly, P1 becomes unavailable as the maximum performance state at 80 C but again become available as the maximum performance state when the temperature crosses back below 78 C. Note that in various implementations, the system may detect whether the temperature is greater than, greater than or equal to, equal to, less than or less than or equal to a particular temperature, as appropriate for the particular situation, to determine if the system has crossed a temperature trip point.

Note that the available performance states may be implemented as a table or other data structure in BIOS, in application software, or in a power management portion of the operating system software. Other ways to encode the appropriate performance states according to the temperature would be readily apparent to those of skill in the art.

Figure 5:
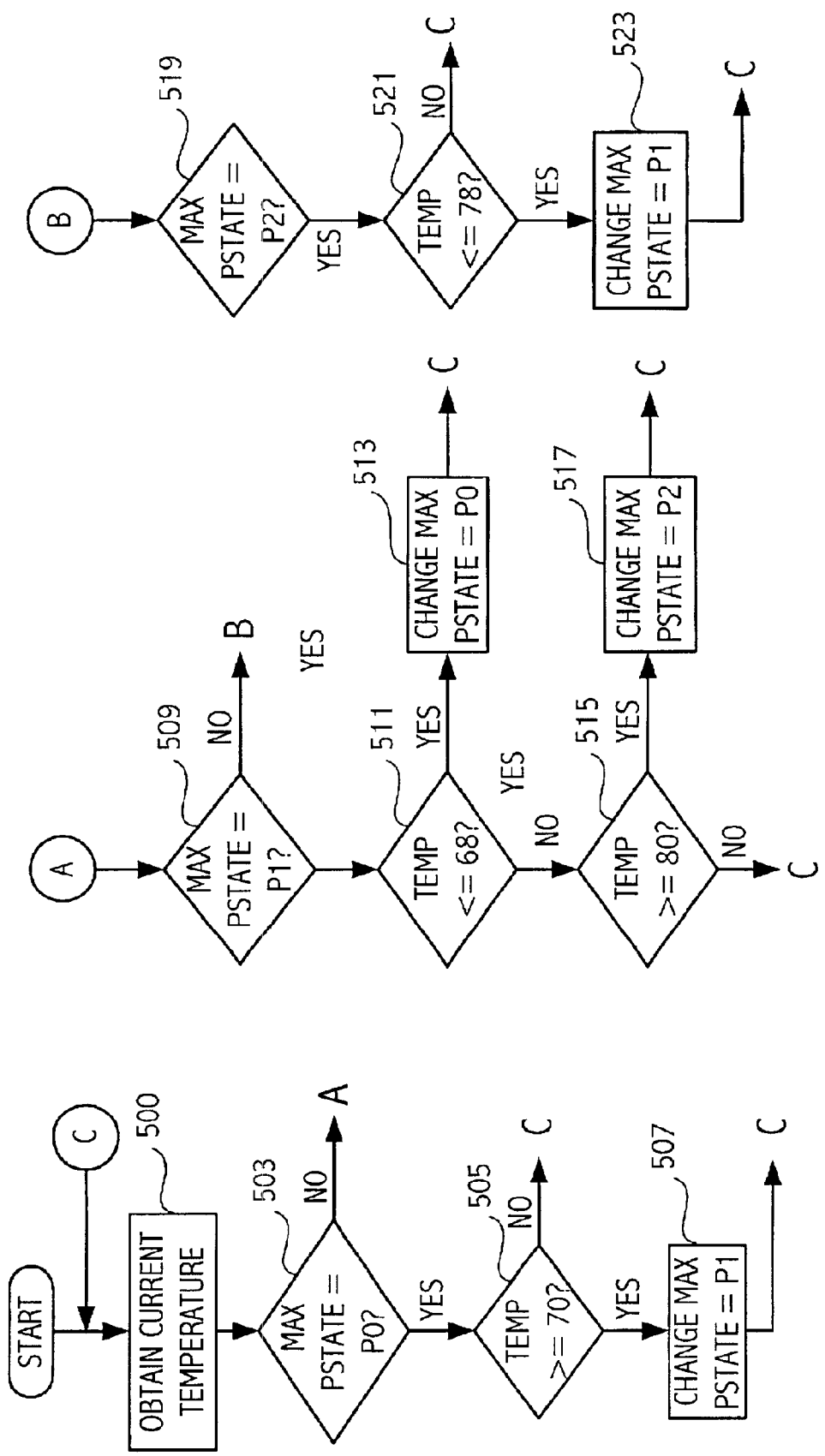
FIG. 5 shows the high level flow of an embodiment of the invention in which the maximum performance state available is adjusted according to temperature measurements.

The flow chart in FIG. 5 provides a high level illustration of the operation of an embodiment of the invention. For ease of understanding, FIG. 5 deals with maximum performance state transitions and does not illustrate operations of all power management functions. The flow chart corresponds to an embodiment of the invention that utilizes three temperature ranges illustrated in FIG. 4. In 500, a temperature associated with the microprocessor, e.g., a die temperature of the microprocessor, is supplied or obtained. The system checks to see if it is operating with the maximum performance state being P0 in 503. If so, the system checks to see if the temperature has crossed above the 70 C trip point. If so, at 507, the system changes the maximum available performance state to P1 and returns to obtain another temperature reading. If the maximum available performance state is not P0, then the system checks to see at 509 if the maximum performance state is P1. If so, system checks to see if the temperature has crossed below 68 C in 511. If so, the maximum performance state is changed to P0 in 513. If not, the system checks in 515 if the temperature has crossed above the 80 C trip point. If so, the maximum performance state is reduced to P2 in 517.

If the maximum performance state was determined in 509 to not be P1, then the system determines that the maximum performance state is P2 and the system checks to see if the temperature is less than or equal to the 78 C trip point in 521. If so, the maximum performance state is increased to P1 in 523 and the system returns to 500 to obtain a current temperature.

Note that the embodiment illustrated in FIG. 5 provides for increasing or decreasing the maximum performance state by one performance state. In other embodiments, the system software and/or hardware may allow for maximum performance state changes of more than one performance state. In addition, while only two trip points are illustrated for reducing a maximum performance state and only two trip points are illustrated for increasing the maximum performance state, the number of trip points can of course vary depending on system design.

In the embodiment illustrated in FIG. 5, hysteresis is implemented at 511 and 521 such that the temperature at which the system switches back to a higher maximum performance state is different (and lower) than the temperature at which it switched away from that maximum performance state to a lower maximum performance state. While implementation of hysteresis is not necessary to practice the invention, it does prevent frequent switching between maximum allowable performance states when the temperature is hovering around a trip point.

If no trip points are crossed, then the maximum performance state remains the same. The process continues periodically evaluating temperatures and setting the appropriate maximum performance state based on the evaluated temperature. In that way, the maximum performance state is determined based on thermal criteria. The system is free to switch to lower performance states according to power management considerations such as processor utilization.

While FIG. 5 provides a high level description of the operation of an embodiment of the invention, determining when temperature thresholds have been crossed may be interrupt driven. For example, temperature sensor apparatus may include programmable high and low thresholds, and generate an interrupt when one of the thresholds is crossed. If the threshold that is crossed causes a maximum performance state change, the high and low thresholds may be set to new threshold values appropriate for the new maximum performance state. The control software is then invoked to change maximum performance states on occurrence of another interrupt.

In comparison to prior art approaches, changing the maximum available performance state according to temperature provides for more gradual reduction in performance as temperature increases. That more gradual reduction in performance results in higher average system performance as temperature increases in comparison to the prior art approach of throttling the clock by a fixed percentage, e.g., 50%, as soon as a first temperature trip point is reached. Thus, a more gradual reduction in performance is provided while still maintaining a high speed rating of the processor in more ideal conditions.

In addition, decreasing the maximum allowable performance state as the temperature goes higher as described herein, allows the case temperature to go higher than solutions that utilize throttling that try to maintain the case temperature at or below a fixed temperature. Allowing the temperature to go higher and not being limited to a fixed case temperature may reduce thermal design costs since the higher allowable case temperature can simplify the thermal design by allowing the system to remove less heat from the system.

As described herein, a computer dynamically adapts its maximum performance state according to a thermal indicator. The description of the invention set forth herein is illustrative, and is not intended to limit the scope of the invention as set forth in the following claims. For instance, while this invention has been described with relation to computer systems such as desktops and a class of mobile computers referred to herein as notebooks (which may also be referred to as laptops or portable computers), the teachings herein may also be utilized in other computing devices, such as servers, multi-processor systems, work stations and/or portable computing devices such as personal digital assistants, (PDAs), which are handheld devices that typically combine computing, telephone/fax, and networking features or in other computing and/or communication equipment, where such power management techniques described herein may prove useful. Other variations and modifications of the embodiments disclosed herein, may be made based on the description set forth herein, without departing from the scope and spirit of the invention as set forth in the following claims.

What is claimed is:

1. A method of operating a computing system:
   periodically determining a temperature associated with an integrated circuit;
   operating the integrated circuit with a first performance state as a maximum performance state, the first performance state being one of a plurality of performance states available at a first determined temperature;
   switching to a second performance state as the maximum performance state when the temperature associated with the integrated circuit exceeds a first temperature threshold; and
   switching back to the first performance state as the maximum performance state when the temperature associated with the integrated circuit is determined to be below a second temperature threshold lower than the first temperature threshold.

2. The method as recited in claim 1 wherein the integrated circuit operates at multiple performance states within respective temperature ranges associated with the determined temperatures.

3. The method as recited in claim 2 wherein a number of performance states available for operating the integrated circuit varies according to the determined temperature.

4. The method as recited in claim 1 wherein a number of performance states available decreases when the determined temperature crosses above the first temperature threshold.

5. The method as recited in claim 1 wherein each performance state is defined by at least one of an operating voltage and frequency of the integrated circuit.

6. The method as recited in claim 1 wherein each performance state is defined at least in part by how much of the integrated circuit is being utilized.

7. The method as recited in claim 1 wherein the integrated circuit is a processor.

8. The method as recited in claim 1 further comprising switching to a third performance state as the maximum performance state when the temperature is determined to be below a third temperature threshold lower than the first and second temperature thresholds and wherein the third performance state is a higher performance state than the first performance state.

9. A computing system comprising:
   an integrated circuit operable at multiple performance states, the performance states being defined by at least one of operating voltage and frequency;
   and wherein the computing system provides that the integrated circuit, at a first detected temperature, has a first maximum performance state and a first plurality of lesser performance states; and wherein at a second detected temperature, higher than the first detected temperature, the integrated circuit has a lower maximum performance state and a second plurality of lesser performance states, the lower maximum performance state providing lower performance than the first maximum performance state in terms of maximum power consumption; and wherein the lower maximum performance state is one of the first plurality of lesser performance states.

10. The computing system as recited in claim 9 further comprising:
    a temperature detection mechanism coupled to detect a temperature associated with the integrated circuit; and
    wherein the computing system is operable to change to a different maximum performance state according to the detected temperature.

11. The computing system as recited in claim 10 wherein the detected temperature is one of ambient temperature, junction temperature, case temperature, or die temperature.

12. The computing system as recited in claim 10 wherein a higher detected temperature results in a lower maximum performance state.

13. The computing system as recited in claim 10 wherein the number of performance states available varies according to the detected temperature.

14. The computing system as recited in claim 10 wherein the integrated circuit is a processor.

15. A computer program product encoded in at least one computer readable medium, the computer program product comprising:
    a plurality of groups of performance operating states, each of the groups of performance operating states having a different maximum operating state, the groups of operating states corresponding to respective different temperature ranges related to operation of a processor; and
    an instruction sequence executable to change to a different group of performance operating states and thereby a different maximum operating state according to a detected temperature associated with the computer system; and wherein a maximum operating state of one group of performance operating states is available as an operating state in another group.

16. The computer program product of 15, wherein the at least one computer readable medium is selected from the set of a disk, tape or other magnetic, optical, or electronic storage medium and a network, wire line, wireless or other communications medium.

17. A computing system comprising:

means for determining a temperature associated with a processor, the processor having a plurality of groups of performance states associated with each of a plurality of temperature ranges, each of the groups having a different maximum performance state and common lower performance states, and wherein a maximum operating state of one group of performance operating states is available as an operating state in another group; and means for changing from a first group of performance states available in which to operate to a second group of performance states according to the determined temperature, thereby changing the available maximum performance state available for processor operation.

18. A method of operating an integrated circuit comprising:

in a first temperature range varying an operating state of the integrated circuit within a first plurality of performance states, the first plurality of performance states having a first performance state as a maximum state;

in a second temperature range varying the operating state of the integrated circuit within a second plurality of performance states having a second performance state as the maximum state, the second performance state being a lower performance state than the first performance state; and in a third temperature range varying the operating state of the integrated circuit within a third plurality of performance states having a third performance state as the maximum performance state, the third performance state being lower than the second performance state;

wherein each of the performance states in the first, second, and third pluralities of performance states are defined by at least one of operating voltage and operating frequency; and wherein the operating state of the integrated circuit is varied in each of the first, second, and third temperature ranges according to integrated circuit utilization.

19. The method as recited in claim 18 wherein the third performance state is one of the performance states in the first and second pluralities of performance states and wherein the second performance state is one of the performance states of the first plurality of performance states.

20. The method as recited in claim 18 wherein one or more lower performance states in each of the first, second, and third plurality of performance states is identical.

21. The method as recited in claim 18 wherein the operating states of the third plurality of performance states is a subset of the plurality of operating states associated with the first and second temperature ranges.

* * * * *